United States Patent Office 2,794,825
Patented June 4, 1957

2,794,825

POLYETHYLENE GLYCOL ESTERS OF ISOCYCLIC ORGANIC CARBOXYLIC ACIDS

Max Matter, Worb, near Bern, Switzerland, assignor to Ciba Pharmaceutical Products Inc., Summit, N. J., a corporation of New Jersey No Drawing. Original application February 13, 1951, Serial No. 210,796, now Patent No. 2,714,607, dated August 2, 1955. Divided and this application September 15, 1953, Serial No. 380,339

Claims priority, application Switzerland February 15, 1950

5 Claims. (Cl. 260—469)

This is a division of my copending application for patent Serial No. 210,796 filed February 13, 1951, Now U. S. Patent 2,714,607.

Esters of high molecular fatty acids and polyethylene glycols or polyethylene glycol monalkyl ethers are known; these compounds possess surface-active properties and are used as wetting agents, detergents and emulsifiers.

From experiments made by the applicant it became clear that certain groups of esters from isocyclic carboxylic acids and polyethylene glycols or polyethylene glycol monoethers have excellent pharmacological properties and that they can for instance be used as infiltration anesthetics, spasmolytics, analeptics and bacteriostatics. Such surprising effects are remarkable because, for instance for the preparation of spasmolytics, the simultaneous use of aminoalcohols or other nitrogen containing compounds was thought necessary.

The main object of my said copending application is concerned with new compounds corresponding to the general formula

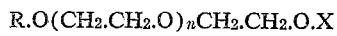
R.O(CH2.CH2.O)nCH2.CH2.O.X wherein R means hydrogen or a hydrocarbon radical having at most 6 carbon atoms, n means 4 to 50 inclusive and X means the radical of a harboxylic acid containing at least one isocyclic ring.

These new compounds are obtained by esterifying the said carboxylic acids or their functional derivatives with polyethylene glycols or with polyethylene glycol monoethers.

The esterification can be carried out directly or the carboxylic acid can be esterified over the acid chloride or the acid anhydride, for instance according to Schotten-Baumann, or in the presence of pyridine. In some other instances it is more convenient to apply the re-esterification method.

As carboxylic acids there may be used the most various kinds of aryl, aralkyl, cycloalkyl and cycloakyl alkyl carboxylic acids such amino-benzoic acids, p-aminosalicyclic acid, cinnamic acids, diphenyl acetic acids, diphenyl-hydroxy-acetic acids, tropic acid, chaulmoogric acid or the like.

The polyethylene glycols used as starting materials are known or can easily be obtained according to an analogous method. They have the general formula

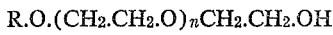
R.O.(CH2.CH2.O)nCH2.CH2.OH wherein n stands for 4 to 50 inclusive and R stands for hydrogen or a hydrocarbon radical having at most 6 carbon atoms. If for instance R stands for isobutyl the polyethylene glycol derivative is obtained by reacting ethylene glycol monoisobutyl ether with n moles of ethylene oxide in a pressure vessel at a temperature of 160° to 170° C. in the presence of a catalytic amount of potassium hydroxide.

The new esters are useful as medicines, disinfectants and as intermediates respectively.

The following examples serve to illustrate and explain the present invention without, however, being restrictive. The relationship of parts by weight to parts by volume is that of kilograms to liters.

Example 1

23.1 parts by weight of diphenylacetyl chloride and 50 parts by weight of polyethylene glycol monoethyl ether of the average molecular weight 500 are heated with 150 parts by weight of pyridine for one hour to 100° C. After cooling it is poured on a mixture of 300 parts by weight of finely divided ice and 170 parts by weight of concentrated hydrochloric acid. The mixture is then rinsed with 900 parts by volume of benzene in a separating funnel. After the discharge of the aqueous layer the benzene solution is extracted each time twice with 2-n hydrochloric acid, 2-n sodium carbonate solution and with a half-saturated sodium chloride solution; all the aqueous solutions are washed in a second separating funnel with 400 parts by volume of benzene. On evaporation of the benzene solutions there remains a colorless oil which solidifies into a wax-like mass if allowed to stand for a long time, this mass being the diphenylacetic acid ester of polyethylene glycol monoethyl ether which is clearly soluble in water and which has spasmolytic properties. The new substance differs from the usual spasmolytics by the absence of basic groups from the molecule.

Phenyl cyclohexyl acetyl chloride can be esterified in an analogous way with polyethylene glycol monohexyl ether.

Example 2

21 parts by weight of phenyl cyclopentane-1-carboxylic acid chloride having a boiling point of 135° C. (10 mm. Hg.), 35 parts by weight of dry technical polyethylene glycol monomethyl ether of the average molecular weight 350 and 150 parts by weight of absolute pyridine are mixed and heated to 110° C. to 120° C. After 5 minutes it is cooled to room temperature and allowed to stand for 10 hours. A copious white crystalline precipitate is being formed. By a short heating the whole is brought into solution again. The whole reaction mass is then poured on a mixture of 300 parts by weight of finely divided ice and 170 parts by volume of concentrated hydrochloric acid. The whole is rinsed with 600 parts by volume of benzene in a separating funnel, the aqueous layer isolated, the benzene solution extracted each time twice with 2-n hydrochloric acid and a saturated sodium hydrogen carbonate solution. The aqueous layers are washed once with fresh benzene. The combined benzene solutions which have been dried with sodium sulfate are evaporated. The phenyl cyclopentane-1-carboxylic acid ester of the polyethylene glycol monomethyl ether is left as a colorless oil which is easily soluble in chloroform, toluene, alcohol and acetone. The new ester is soluble in water at temperatures below about 30° C.; on heating it is separated from the aqueous solution. As the polyethylene glycol monomethyl ether used for the esterification consists of a mixture of substances with different degrees of polymerisation the molecular weight of the new ester may also vary within a certain range. The higher molecular portions can be separated from the low molecular portions by physical methods. For this purpose one may proceed as follows: 3.82 grams of the ester produced according to this example are dissolved in 100 cc. of water and extracted three times with 100 cc. of ether. The ethereal solutions are washed three times with 30 cc. of water. The ethereal solutions are dried over sodium sulfate and evaporated, whereupon 3.10 grams of ester remain which can partly be precipitated from an aqueous solution by heating it to over 30° C. From the aqueous solutions 0.70 gram of ester can be isolated by extraction with chloroform; the ester is then precipitated from an aqueous solution only on heating it up to a temperature of over 60° C.; this fraction contains the higher molecular portions.

The new ester is a valuable spasmolytic.

What is claimed is:

1. The new esters of the formula

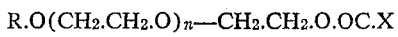

wherein R stands for a member selected from the group consisting of hydrogen and saturated hydrocarbon radicals containing at most 6 carbon atoms, $n$ is an integer from 4 to 50 and X stands for a member selected from the group consisting of the radicals of the formulae:

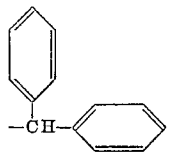

and

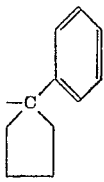

2. The new esters of the formula

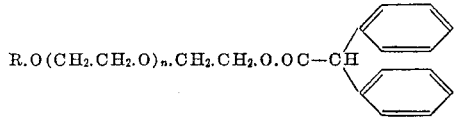

wherein R stands for a saturated hydrocarbon radical containing at most 6 carbon atoms and $n$ is an integer from 4 to 50.

3. The new esters of the formula

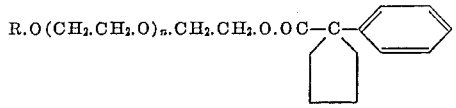

wherein R stands for a saturated hydrocarbon radical containing at most 6 carbon atoms and $n$ is an integer from 4 to 50.

4. The new ester of the formula

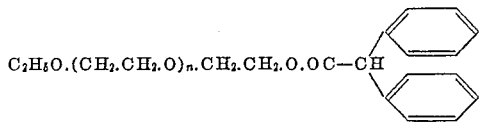

which has an average molecular weight of about 694.

5. The new ester of the formula

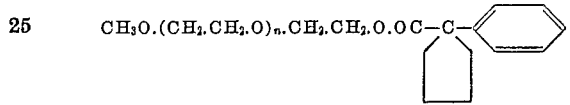

which has an average molecular weight of about 522.

References Cited in the file of this patent
UNITED STATES PATENTS

| | | |
|---|---|---|
| 1,710,424 | Loehr | Apr. 23, 1929 |
| 1,970,578 | Schoeller et al. | Aug. 21, 1934 |
| 2,396,513 | Jones | Mar. 12, 1946 |
| 2,648,693 | Schmerling | Aug. 11, 1953 |